Jan. 8, 1935.  F. D. REYNOLDS  1,987,492
COOKING UTENSIL
Filed Sept. 12, 1932
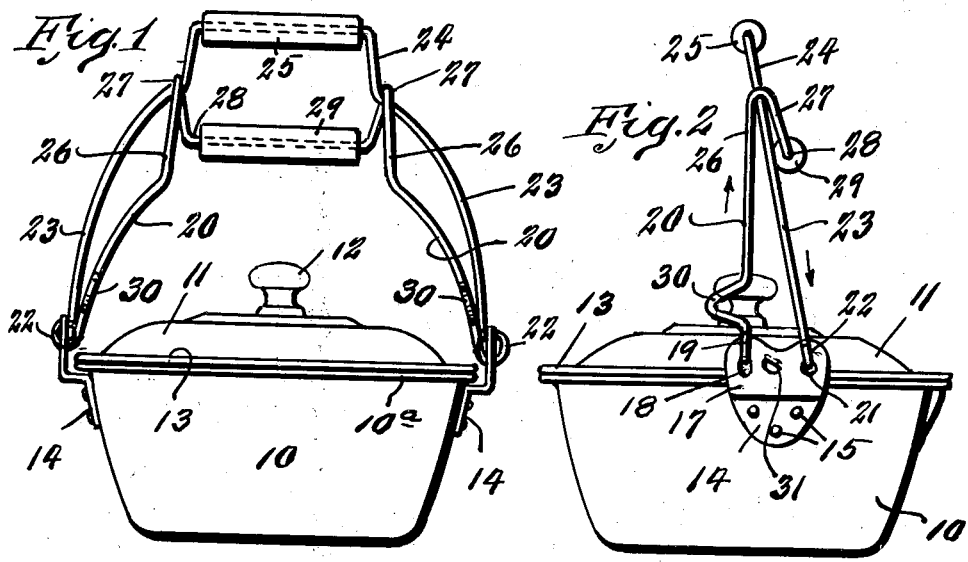
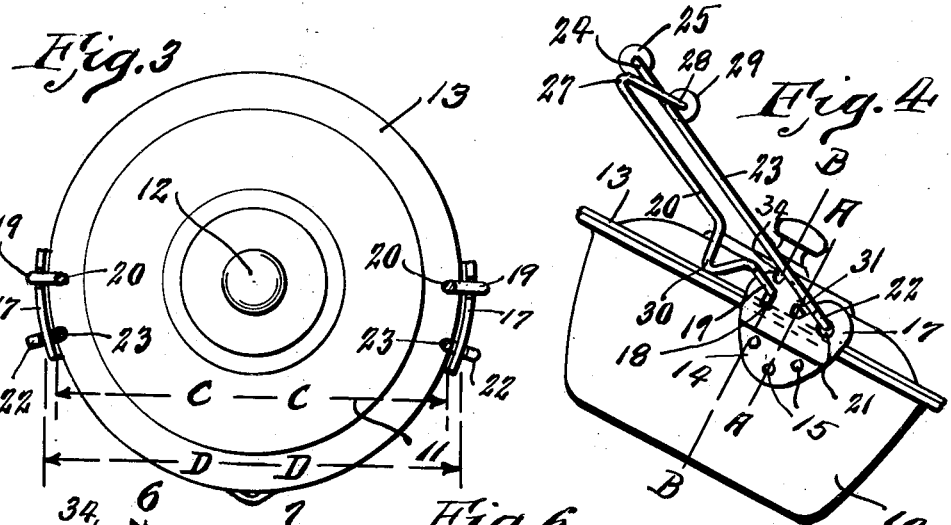
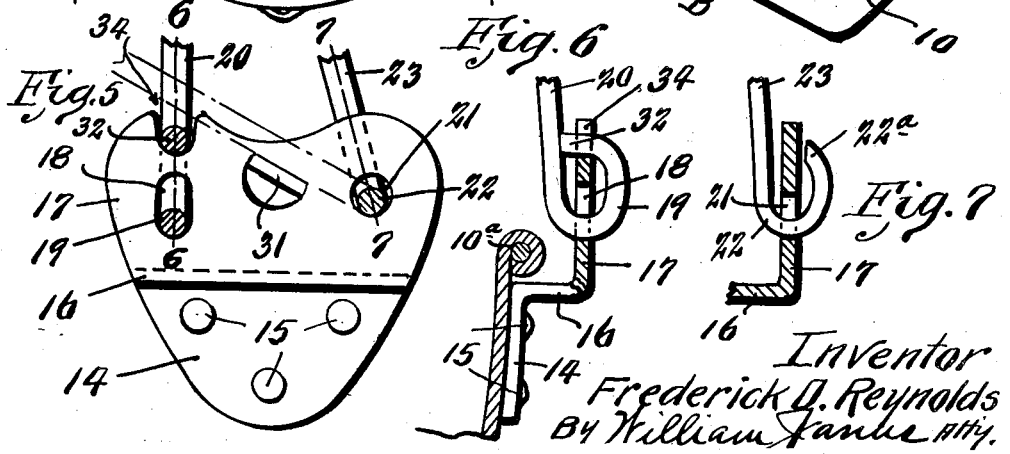
Inventor
Frederick D. Reynolds
By William Fanlee Atty.

Patented Jan. 8, 1935

1,987,492

UNITED STATES PATENT OFFICE 1,987,492

COOKING UTENSIL

Frederick D. Reynolds, St. Louis, Mo.

Application September 12, 1932, Serial No. 632,751

2 Claims. (Cl. 53—1)

This invention relates generally to cooking utensils and more particularly to kettles provided with lids. Where a kettle is used to boil, for instance, vegetables, such as potatoes, and it is desired to drain the water therefrom, it is necessary to hold the kettle in one hand and with the other hand hold the lid in position. This often results in the scalding of the hand holding the lid by the steam escaping from the kettle. Furthermore, this method is unsatisfactory as it is awkward to hold the kettle of boiling water in a tilted position and at the same time hold the lid thereon.

The objects of the present invention are to provide a kettle having a pair of bails so interengaged as to cause the automatic tilting of the kettle when the handles of said bails are pressed together.

Other objects of the invention are to provide means for retaining the lid in position on the kettle when the latter is tilted in a predetermined direction.

Still other objects of the invention are to provide a kettle or pot having pivotally mounted thereon two bails, one of which is mounted spaced from the center of said kettle, said bails being provided with handles arranged in spaced-apart relation and adapted to be grasped in one hand and pressed together, whereby said bails are moved in opposite directions and said kettle is tilted, there being means provided which lock the lid on the kettle when the latter occupies tilted position.

Further objects of the invention are to provide a kettle having a pair of bails pivotally mounted thereon and means for holding said bails in upright or tilted positions.

With these and other objects in view, my invention consists in certain novel features of construction and arrangement of parts, hereinafter more fully described and claimed, and illustrated in the accompanying drawing, in which—

Figure 1 is a rear elevation of my improved kettle.

Figure 2 is a side elevation thereof.

Figure 3 is a top plan view with the bails shown in cross section.

Figure 4 is a side elevation showing the kettle in tilted position.

Figure 5 is an enlarged detail view showing the means for pivotally mounting the bails on the kettle.

Figure 6 is a vertical cross section taken on line 6—6 of Figure 5.

Figure 7 is a vertical cross section taken on line 7—7 of Figure 5.

Referring by numerals to the accompanying drawing, 10 indicates a kettle or pot which may be of any desired size or shape and which can be made of any suitable material, such as aluminum, enamelware, and the like. 11 is a lid therefor and is provided with a centrally disposed handle 12 and a marginal horizontally disposed flange 13.

Fixed to the sides of the kettle approximately at diametrically opposed points is a pair of ears 14. Each ear has its lower end secured to the kettle by means of rivets 15 and is formed intermediate its ends with a bend or jog 16 which spaces the upper end 17 from said kettle and clears the rolled edge 10a thereof.

As shown in the drawing, each ear 14 is substantially heart-shape in front elevation and the vertical central line A—A thereof is arranged to one side of the vertical axis B—B of the kettle.

A vertically disposed elongated slot 18 is formed in one side of upper end 17 of each ear substantially in the same vertical plane with axis B—B. Pivotally mounted in said slots are the lower ends 19 of a bail 20.

The other side of the upper end of each ear is provided with an aperture 21 and pivotally mounted therein are the lower ends 22 of a bail 23. Bail 23 has its upper medial portion formed in an inverted U-shape, as indicated at 24, and arranged on the horizontal portion thereof is a handle 25.

Bail 20 has its medial portion formed with straight sections 26 which extend upwardly and are then bent downwardly over the bail 23, as indicated at 27 at points of junction of the curved portions of said bail 23 and the straight portions of section 24. The downwardly presented portions 27 of bail 20 are connected by a horizontal section 28 on which is arranged a handle 29.

Thus the bails 20 and 23 are interengaged and the handles 25 and 29 are arranged in spaced relation so that both can be grasped in one hand and pressed together. Bail 23 which is pivotally mounted ahead of the axis B—B of the kettle extends obliquely and rearwardly so that the handle 25 thereof is disposed in vertical plane with said axis. Bail 25 which has pivotal connection with the kettle substantially on a vertical plane with the axis B—B has its upper portion bent forwardly and downwardly so that the handle 29 thereof is disposed below and slightly forward of handle 25.

Normally, as in carrying the kettle, it is suspended by means of handle 25 which being arranged in vertical plane with the axis of the pot supports the latter in normal or horizontal position. When both handles are grasped in the hand and brought together, the bails move in opposite directions, as indicated by arrows in Figure 2, thereby tilting the kettle into the position shown in Figure 4.

In order to retain the lid in position when the pot 10 is tilted, suitable means is used to hold the lid. As shown in Figures 1 to 4, bail 20 is formed adjacent to ears 14 with rearwardly and laterally disposed projections or bends 30 which when the parts occupy positions shown in Figure 4 bear down against the flange 13 of lid 11 and hold the latter against displacement. When the bails occupy upright positions, such as shown in Figure 2, these projections 30 are spaced from flange 13 and do not interfere with the removal or positioning of the lid.

The upper portions 17 of ears 14 are formed substantially concentric with the pot so that the forward ends or edges of said ears are arranged closer together than the outside diameter of said pot or the outside diameter of flange 13, as indicated by lines C—C and D—D, respectively. Consequently the lid cannot slide downwardly when the pot occupies tilted position.

When the bails 20 and 23 occupy tilted positions and lid 13 is placed on the pot, projections 30 form stops and limit the downward movement of said bails. When the lid is removed from the pot, said projections generally bear against the rolled edge 10a of the pot. However, in order to provide positive stop for the bails independently of projections 30, especially when the lid is removed, the upper portion 17a of each ear is formed with a projection or tongue 31 which is bent inwardly and extends into the path of bail 23 and limits the downward movement thereof, as shown in full lines in Figure 4 and in dotted lines in Figure 5.

The lower ends 18 of bail 20 are bent to form elongated eyes with their extremities 32 extending horizontally over the upper edge of member 14 and resting against the shoulders of bail 20. The upper edge of each member 14 is formed with an upwardly presented notch 34 which is disposed in vertical plane with slot 18. When the bail 20 occupies vertical position (see Fig. 2) the extremities 32 drop into said notches 34, thereby locking both bails in upright positions. When the pot is suspended or carried by bail 20, said bail moves upwardly in the slots 18, whereupon the extremities 32 are disposed clear of notches 34 and said bails and said pot can occupy oblique positions relatively to each other when the bails are actuated.

The slots 18 are located in vertical plane to permit this vertical movement of bail 20 and apertures 21 are formed considerably larger than the looped ends 22 of bail 23 in order to allow sufficient play of the latter in correlation with bail 20. As shown in the drawing, the extremities 22a of eyes 22 are spaced from the shank portions of bail 23 and are disposed on the opposite side of the portion 17 of member 14.

Thus both bails are prevented from falling down the side of the pot and are always in position where they can be grasped in the hand. By the use of the two interengaged bails, the pot can be supported and automatically tilted by one hand, while the cover when used is automatically locked in position during the tilting movement of said pot.

My invention is of simple construction and can be used in connection with pots of various sizes. It permits the tilting and draining of the pot by using one hand only and it prevents scalding of the user's hand.

While I have shown and described herein the preferred forms of my invention, it is obvious that various changes in the construction of my improved pot and support can be made without departing from the spirit of my invention.

I claim:

1. In a device of the class described, the combination of a cooking vessel, a cover therefor, a pair of ears fixed to said vessel at diametrically opposed points, each ear being provided with a pair of spaced openings aligned with the openings of the other ear, a pair of bails having their ends pivotally mounted in the respective aligned openings, one of said bails being bent adjacent to each end to form a V-shaped rearward extension whereby when said bail is tilted rearwardly said extension presses against said cover and holds it in position on said vessel.

2. In a device of the class described, the combination of a cooking vessel, a cover therefor, a pair of ears fixed to said vessel, each of said ears extending a suitable distance forwardly of the axis of said vessel whereby the distance between the forward ends of said ears is less than the diameter of said cover and the latter is thereby prevented from being displaced in a forward direction, a pair of bails having their ends pivotally mounted in said ears in spaced-apart relationship with each other, the rear bail being mounted substantially in vertical plane with the axis of said vessel and the other bail being mounted forwardly of said axis whereby said vessel can be tilted forwardly by the manipulation of said bails, and a rearward extension formed on said rear bail adjacent to each end thereof whereby when said bail is tilted rearwardly said extensions bear against said cover and hold it in place.

FREDERICK D. REYNOLDS.